No. 866,811. PATENTED SEPT. 24, 1907.
J. RIEDEMANN.
DEVICE FOR THE BARRIERS OF HORSE STABLES.
APPLICATION FILED JAN. 25, 1907.
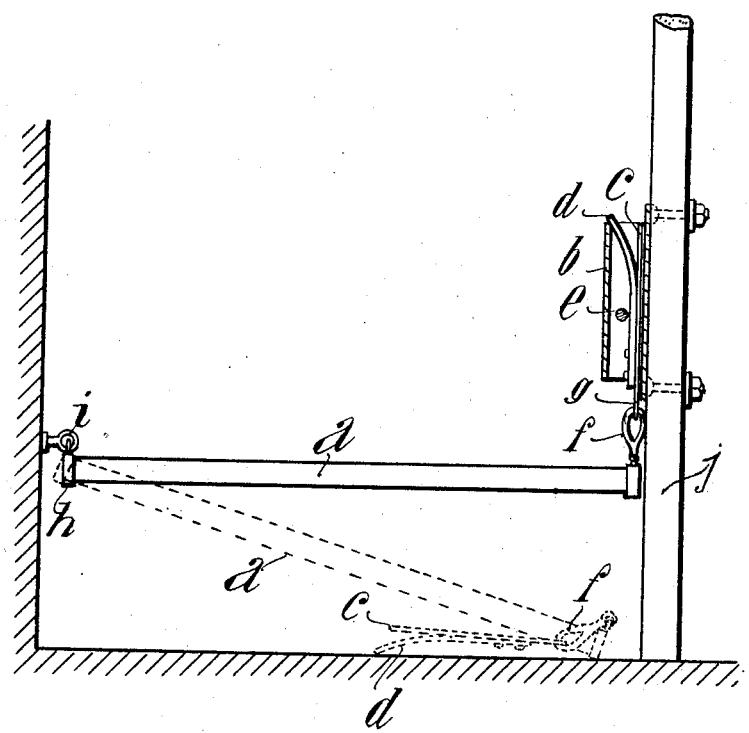
Witnesses.
Inventor.

UNITED STATES PATENT OFFICE.

JOHANN RIEDEMANN, OF GLINDE, NEAR UETERSEN, GERMANY.

DEVICE FOR THE BARRIERS OF HORSE-STABLES.

No. 866,811.   Specification of Letters Patent.   Patented Sept. 24, 1907.

Application filed January 25, 1907. Serial No. 354,063.

*To all whom it may concern:*

Be it known that I, JOHANN RIEDEMANN, a subject of the German Emperor, and a resident of Glinde, near Uetersen, Germany, have invented certain new and useful Improvements in a Device for the Barriers of Horse-Stables, of which the following is a specification.

The present invention has for its object a device, applicable for the barriers of horse-stables, which would obviate the disadvantages which exist in the use of the common barriers and devices which often cause serious injuries and hurts to the animals when they kick and the barrier falls on the horses back or they happen to get under the barriers, or get hung on the barrier by the hind legs, owing to the barriers being swingingly attached.

There are devices, applicable to the barriers of horse-stables, which are detachable by spring arrangements, but these do not give security for the horses, owing to such devices being held to the posts by chains which lets the barriers swing all ways.

The accompanying drawing represents a form of construction of the invention.

The barrier $a$, which, as usual, is fastened to the wall, by an end, with a hook $h$ and a ring $i$, is attached to the stable pillar $j$, by its other end by a case $b$, rigidly fixed on the pillar, having an iron plate $c$ fixed with a spring $d$ which by resting against a bar or rod $e$ which is cross-wise arranged in the said case, holds the barrier, which is attached to the lower side of the plate by a spring hook $f$ hooked in the eye $g$ which is in the said side of the said plate, in such a manner, that the said barrier falls down, the moment a horse lies or hangs upon it, owing to the said plate $c$ with the spring slipping out of engagement with the said bar or rod, against which and the back part of the case the plate and the spring rests, somewhat after the manner of a wedge, and bring down the barrier, whereby this arrangement not only prevents horses hanging on the barrier, but it also prevents horses getting under, as the barrier cannot be lifted like the barriers which are attached with chains and the like.

The energy of the spring is chosen in such a way, that the barrier can only be brought down, as shown in dotted lines, by the weight of a horse, and a lateral detachment of the device is impossible as the device is rigidly fixed to the pillar, and the arrangement does not allow of it, and also the spring and the iron plate are so situated in the case, that they do not project as to be a hindrance.

I claim:

In a device for the barriers of horse-stables, in combination; a pillar $j$ fixed in the floor of the stable, a box $b$ fixed on the said pillar, a rod $e$ cross-wise arranged in the said box, a plate $c$ having an eye $g$ and provided with a spring $d$ inserted between the back plate of the box $b$ and the rod $e$ adapted to hold the said plate therein by the spring, a spring hook $f$ hooked in the eye of the said plate $c$, a barrier $a$ fixed to the lower end of the said hook, a hook $h$ fixed to the said barrier at the opposite end to that of the hook $f$, and a ring $i$ fixed on the wall of the stable into which the hook $h$ is hooked, substantially as shown and described.

JOHANN RIEDEMANN.

Witnesses:
G. A. HESS,
M. HEUCHLOW.